United States Patent
Park et al.

(10) Patent No.: US 9,867,322 B2
(45) Date of Patent: Jan. 16, 2018

(54) SAFETY APPARATUS FOR CULTIVATOR

(71) Applicant: Ki Hyuk Park, Kangwon-Do (KR)

(72) Inventors: Ki Hyuk Park, Kangwon-Do (KR); Jae Hyun Park, Inchun-Si (KR)

(73) Assignee: Ki Hyuk Park, Kangwon-Do (KR)

( * ) Notice: Subject to any disclaimer, the term of this patent is extended or adjusted under 35 U.S.C. 154(b) by 0 days.

(21) Appl. No.: 15/262,865

(22) Filed: Sep. 12, 2016

(65) Prior Publication Data
US 2017/0142890 A1    May 25, 2017

(30) Foreign Application Priority Data
Nov. 19, 2015    (KR) .................. 10-2015-0162173

(51) Int. Cl.
 *A01B 61/04*    (2006.01)
 *A01B 3/24*    (2006.01)
(52) U.S. Cl.
 CPC ............. *A01B 61/044* (2013.01); *A01B 3/24* (2013.01); *A01B 61/046* (2013.01)
(58) Field of Classification Search
 CPC ...... A01B 61/04; A01B 61/044; A01B 61/046
 USPC ............................................. 111/260.5, 168
 See application file for complete search history.

(56) References Cited

U.S. PATENT DOCUMENTS

| | | | | |
|---|---|---|---|---|
| 2,228,865 A | * | 1/1941 | Bird | A01B 13/08 172/261 |
| 3,905,425 A | * | 9/1975 | Jackson | A01B 59/004 172/260.5 |
| 4,209,067 A | * | 6/1980 | Poggemiller | A01B 61/046 172/190 |
| 4,249,614 A | * | 2/1981 | van der Lely | A01B 61/046 172/260.5 |
| 7,823,651 B2 | * | 11/2010 | Olson | A01B 61/046 172/260.5 |

FOREIGN PATENT DOCUMENTS

| | | |
|---|---|---|
| JP | S60-062672 A | 4/1985 |
| JP | 2006-105226 A | 4/2006 |
| KR | 10-2012-0016776 A | 2/2012 |
| KR | 10-1117769 B1 | 3/2012 |

OTHER PUBLICATIONS

KIPO Office Action dated Dec. 17, 2015.
KIPO Decision to Grant a Patent dated Apr. 29, 2016.

* cited by examiner

*Primary Examiner* — John G Weiss
(74) *Attorney, Agent, or Firm* — Rabin & Berdo, P.C.

(57) ABSTRACT

Provided is a safety apparatus for a cultivator. A driving cylinder includes a body wherein a rod having a pressurizing plate at a front end of the rod is inserted into the body; a first inlet hole and a second outlet hole which are formed at one side of the body; a first inlet hole and a second outlet hole formed at a rear portion of the pressurizing plate when the rod extends from the body; a first outlet hole and a second inlet hole formed at the other side of the body; a relief valve at the first outlet hole; a first hydraulic line to connect the relief valve and the first inlet hole; a second hydraulic line to connect the second outlet hole and the second inlet hole; and a check valve at any of the second outlet hole, the second inlet hole and the second hydraulic line.

8 Claims, 6 Drawing Sheets

SAFETY APPARATUS FOR CULTIVATOR

TECHNICAL FIELD

The present invention relates to a safety apparatus for a cultivator, and in particular to a safety apparatus for a cultivator which is able to prevent any damage in such a way to avoid impacts when an over load occurs due to a predetermined obstacle, for example, a rock, a stone, etc. during the cultivation which, in general, is carried out using a cultivator, for example, a tractor plow, a mould plow, a furrow plow, an earth-moving equipment, a pan-breaker, etc., and is able to enhance a work efficiency, wherein the safety apparatus for a cultivator can be manufactured in a simple-looking structure.

BACKGROUND ART

In the descriptions of the present invention, a cultivator will be described as a representative example of a plow which is most mainly used among a variety of cultivators, but it is not limited thereto.

In general, the plow has been used for the sake of cultivation of various plants, wherein soil is excavated and turned over using domestic animals, for example, horses and cow, a machine, etc., thus making ridges.

A conventional plow apparatus detachably attached to a tractor is equipped with a multiple plow device formed of a plurality of plowing units which are selected based on the size and horse power of the tractor. The conventional plow apparatus for a tractor is equipped with three or eight plowing units. Each plowing unit may be installed in a zigzag direction with respect to a main frame or may be installed at a main frame in a diagonal line with respect to a towing direction.

When a plowing work is carried out using a conventional plow apparatus for a tractor, a plowing unit may collide with a rock hidden in soil. If the plowing unit is fixedly installed at the main frame, the plowing unit may directly receive the impulsive force from the rock, for which the plowing unit may be broken or deformed, so the shape of a furrow may collapse or the apparatus may have a problem.

The Korean patent registration No. 10-1117769 filed by the same applicant as the present invention describes a safety apparatus which is able to prevent any damage to a plowing unit.

The aforementioned conventional device for a tractor includes a main frame equipped with a tractor connection unit the front of which is connected to a tractor for the sake of towing, a plurality of plowing units installed rotatable at the main frame, a plurality of driving cylinders which are able to rotate upward and downward each of the plowing units, a cushioning cylinder which is fixedly installed at the main frame and is engaged slidable for a piston rod to come in and out, a first hydraulic line which is employed to connect one side of the driving cylinder and the cushioning cylinder, an assistant cylinder which is fixedly installed at the main frame and is engages slidable for the piston rod to come in and out, a second hydraulic line which is employed to connect the other side of the cushioning cylinder and one side of the assistant cylinder, and a third hydraulic line which is employed to connect the other side of the assistant cylinder and the other side of the driving cylinder.

The operation thereof will be described. If the plowing unit contacts with a rock, it will rotate upward by means of an external force due to the rock, and the hydraulic pressure inside of the driving cylinder will move via the first hydraulic line to an inlet port of the cushioning cylinder, and the cylinder rod will slide into the inside of the cushioning cylinder, and the hydraulic pressure inside of the cushioning cylinder may discharge via an outlet port, an inlet port of the assistant cylinder and the second hydraulic line.

The cylinder rod of the assistant cylinder will slide into the inside of the assistant cylinder, and the hydraulic pressure of the inside thereof will discharge via the outlet port and will move toward the other side of the driving cylinder via the third hydraulic line, thus absorbing an over pressure which has been generated due to the rock.

If the plowing unit, which has rotated upward due to the rock, returns back to its initial position, the hydraulic pressure will, on the contrary, move into the assistant cylinder and the cushioning cylinder. More specifically, the hydraulic pressure which has moved in from the other side of the driving cylinder, will be inputted into the outlet port of the assistant cylinder via the third hydraulic line, by which the cylinder rod is pushed and exposed to the outside, and the hydraulic pressure inside of the assistant cylinder will discharge via the inlet port and will be inputted into the outlet port of the cushioning cylinder via the second hydraulic line.

As the cylinder rod of the cushioning cylinder is exposed to the outside, the inside hydraulic pressure may be inputted into the driving cylinder via the first hydraulic line, so it can return back to its initial position.

A spring is installed inside of the assistant cylinder so as to elastically support the cylinder rod of the assistant cylinder, by means of which the cylinder rod can be elastically supported when it is inserted inside by means of the inputted hydraulic pressure.

In the conventional technology, there, however, should be provided a plurality of the hydraulic lines to connect the driving cylinder, the assistant cylinder, and the cushioning cylinder, for which the configuration may become very complicated, and the manufacturing may cost a lot.

Since the assistant cylinder is equipped with a spring which is disposed inside of the same, the hydraulic pressure which has discharged from the assistant cylinder when the plow excavates soil, may be inputted via the third hydraulic cylinder into the driving cylinder. For this reason, the cylinder rod may be retracted, by means of which the plow may be tilted backward little by little even though a predetermined obstacle, for example, a rock, etc. is not met. So, the soil may not be cultivated evenly.

DISCLOSURE OF THE INVENTION

Accordingly, it is an object of the present invention to provide a safety apparatus for a cultivator which may be manufactured in a simpler structure since any impact from a rock to the cultivator can be alleviated only by a driving cylinder, wherein the cultivator can be supported stable.

To achieve the above objects, according to a first embodiment of the present invention, there is provided a safety apparatus for a cultivator, which may include, but is not limited to, a main frame which includes a tractor connection unit a front portion of which is connected to a tractor for the sake of towing; a cultivating unit which is installed rotatable upward and downward at the main frame, thus cultivating soil; and a driving cylinder which is able to elastically support the cultivating unit with respect to the rotations from the main frame, wherein the driving cylinder includes a body wherein a rod having a pressurizing plate at a front end of the rod is inserted into the body; a first inlet hole and a second outlet hole which are formed at one side of the body;

a first inlet hole and a second outlet hole which are formed and positioned at a rear portion of the pressurizing plate when the rod extends from the body; a first outlet hole and a second inlet hole which are formed at the other side of the body; a relief valve which is installed at the first outlet hole; a first hydraulic line which is employed to connect the relief valve and the first inlet hole; a second hydraulic line which is employed to connect the second outlet hole and the second inlet hole; and a check valve which is installed at any of the second outlet hole, the second inlet hole and the second hydraulic line so as to prevent the hydraulic pressure from being returning back to the second outlet hole, wherein the first inlet hole and the second outlet hole position at a rear portion of the pressurizing plate when the rod extends from the body, and the first outlet hole and the second inlet hole position at a front portion of the pressurizing plate when the rod is retracted.

To achieve the above objects, according to a second embodiment of the present invention, there is provided a safety apparatus for a cultivator, which may include, but is not limited to, a main frame which includes a tractor connection unit a front portion of which is connected to a tractor for the sake of towing; a cultivating unit which is installed rotatable upward and downward at the main frame, thus cultivating soil; and a driving cylinder which is able to elastically support the cultivating unit with respect to the rotations from the main frame, wherein the driving cylinder includes a body wherein a first rod and a second rod are inserted into both sides of the body, wherein a pressurizing plate is provided at a front end of each of the first rod and the second rod; a first outlet hole and a third inlet hole which are formed at an intermediate portion of the body; a first inlet hole and a second outlet hole which are formed at one side of the body into which the first rod is inserted; a second inlet hole and a third outlet hole which are formed at the other side of the body into which the second rod is inserted; a relief valve which is installed at the first outlet hole; a first hydraulic line which is employed to connect the relief valve and the first inlet hole; a second hydraulic line which is employed to connect the relief valve and the second inlet hole; a third hydraulic line which is employed to connect the second outlet hole and the third inlet hole; a fourth hydraulic line which is employed to connect the third outlet hole and the third inlet hole; a first check valve which is installed at the second outlet hole or the third hydraulic line so as to prevent the hydraulic pressure from returning back to the second outlet hole; a second check valve which is installed at the third outlet hole or the fourth hydraulic line so as to prevent the hydraulic pressure from returning back to the third outlet hole, wherein when the first rod extends from the body, the first inlet hole and the second outlet hole position at a rear portion of the pressurizing plate, and when the second rod extends, the second inlet hole and the third outlet hole position at a rear portion of the pressurizing plate, and the first outlet hole and the third inlet hole position at a front portion thereof when the first rod and the second rod are retracted.

To achieve the above objects, according to a third embodiment of the present invention, there is provided a safety apparatus for a cultivator, which may include, but is not limited to, a main frame which includes a tractor connection unit a front portion of which is connected to a tractor for the sake of towing; a cultivating unit which is installed rotatable upward and downward at the main frame, thus cultivating soil; and a driving cylinder which is able to elastically support the cultivating unit with respect to the rotations from the main frame, wherein the driving cylinder includes a body wherein a rod is inserted in the body, wherein a pressurizing plate is provided at a front end of the rod; a first hydraulic hole which is formed at one side of the body; a second hydraulic hole which is formed at the other side of the body; and a hydraulic line which is employed to connect the first hydraulic hole and the second hydraulic hole, wherein the first hydraulic hole positions at a rear portion of the pressurizing plate when the rod extends from the body, and the second hydraulic hole position at a front portion of the pressurizing plate when the rod is retracted.

Advantageous Effects

Different from the conventional technology, the present invention does not need the assistant cylinder and the cushioning cylinder, and the hydraulic lines for connecting them. In the present invention, the inlet hole and the outlet hole of the driving cylinder itself are connected as a hydraulic line, for which the configuration of the product may look simpler, and the manufacturing cost is low.

Moreover, since a predetermined constant pressure is loaded on the rod of the cylinder even during a normal cultivation wherein a predetermined obstacle is not met, there may not occur any occasion where a cultivating unit is not lifted up, whereby the cultivation can be carried out evenly.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

The present invention will be described with reference to the accompanying drawings.

Throughout the description of the present invention, a plow which is a kind of a cultivator, will be described as an example.

Figure 1:
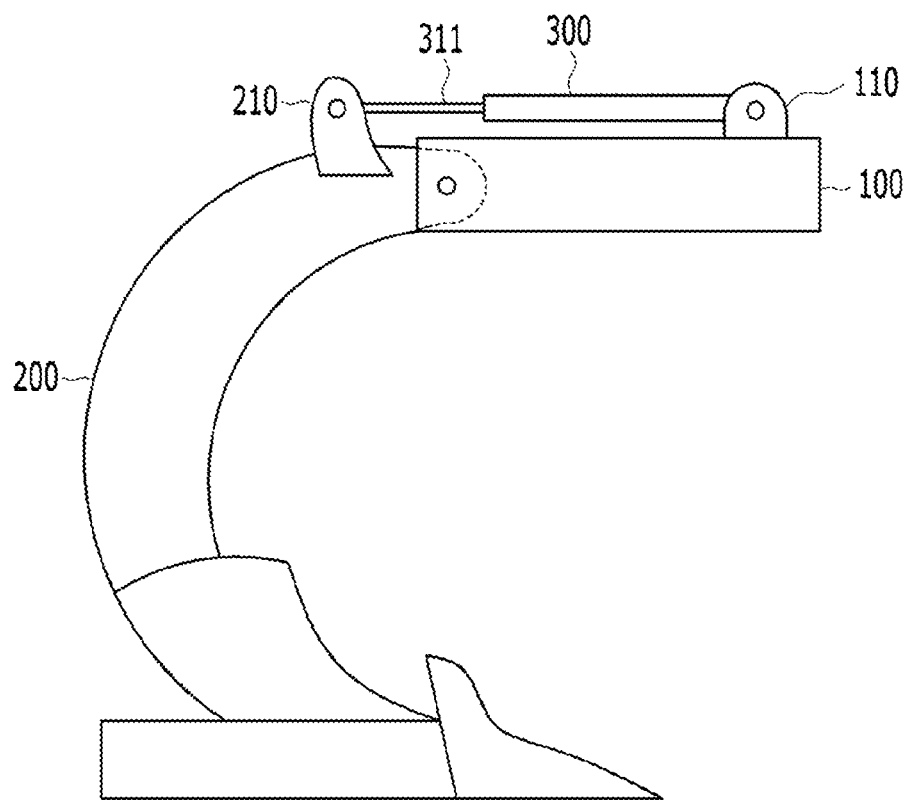
FIG. 1 is a view illustrating an example of a cultivator according to the present invention.
Figure 2:
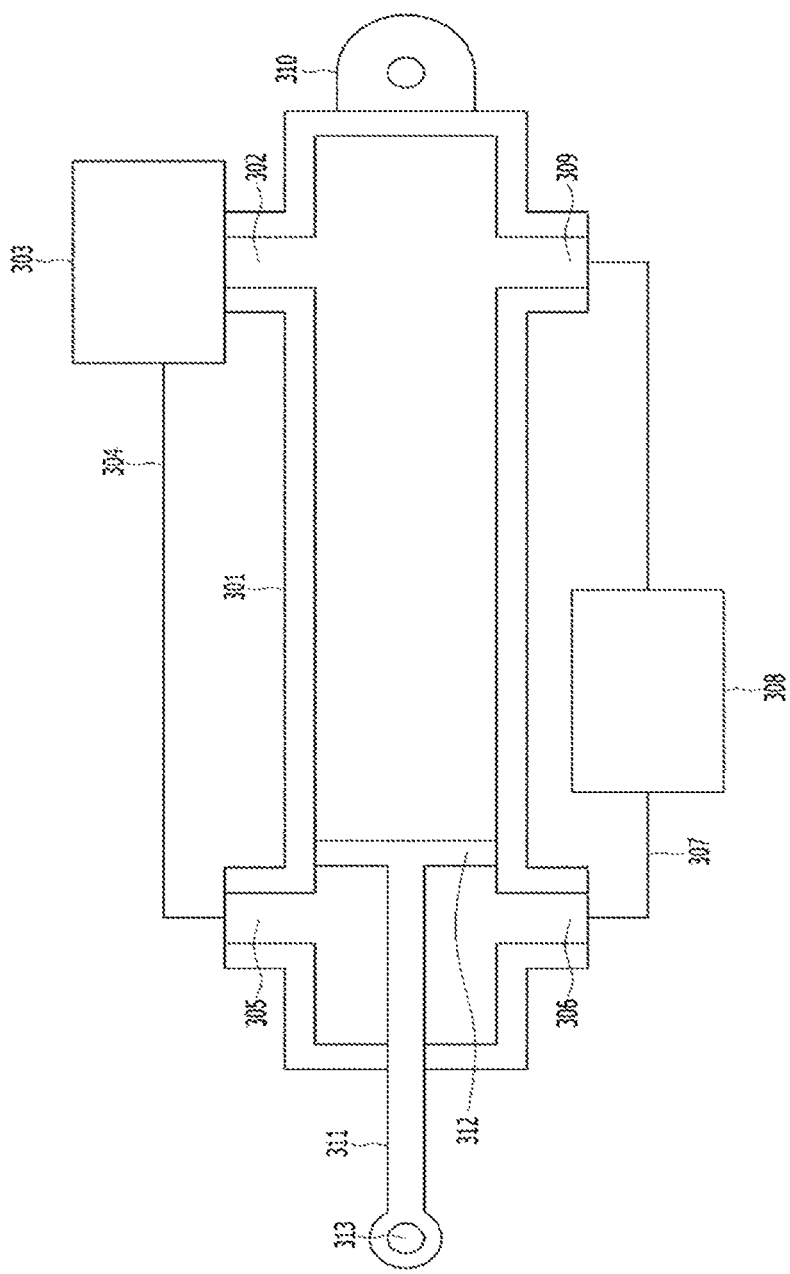
FIG. 2 is a view illustrating a safety apparatus for a cultivator according to a first embodiment of the present invention.

FIG. 1 is a view illustrating an example of a cultivator according to the present invention. Referring to FIG. 1, there are provided a main frame 100, a cultivating unit 200, and a driving cylinder 300.

A tractor connection unit connected to a tractor is provided at the front of the main frame 100 for the sake of towing.

The cultivating unit 200, namely, a plowing unit 200, is employed to carry out a plowing work, more specifically, a work to excavate and turn over soil. The plowing unit 200 is installed at the main frame 100.

The plowing unit 200 may be installed rotatable upward and downward at the main frame 100 and may be formed of a share and a mould board.

The driving cylinder 300 may be installed matching one to one with the plowing unit 200, and the driving cylinder 300 is a hydraulic cylinder which uses a hydraulic pressure. It is a double acting cylinder which is configured to reciprocate in a straight line in cooperation with the plowing unit 200 which rotates upward and downward.

An end of the rod 311 of the driving cylinder 300 is engaged to be rotatable at the top of the plowing unit 200 with the aid of a rotation engaging unit 210, and a rear end of the driving cylinder 300 is engaged rotatable to the main frame 100 with the aid of an engaging unit 110.

In the configuration of the driving cylinder 300 according to a first embodiment of the present invention, the rod 311 is engaged to one side of a cylinder body 310, and a pressurizing plate 312 is provided at a front end of the rod 311, and a pin assembling unit 313 is provided at a rear end thereof, wherein the pin assembling unit 313 is engaged to a rotation engaging unit 210 of the plowing unit 200.

Moreover, a first inlet hole 305 and a second outlet hole 306 are formed at one side of the body 310, namely, at one side where the rod 311 is inserted. The first inlet hole 305 and the second outlet hole 306 will position at a rear side portion of the pressurizing plate 312 when the rod 311 extends.

A first outlet hole 302 and a second inlet hole 309 may be formed at the other side of the body 310, and a relief valve 303 may be installed at the first outlet hole 302.

The relief valve 303 may be configured in such a way that it may be open if a predetermined hydraulic pressure is applied to the inside of the cylinder body 301.

The first hydraulic line 304 is connected between the relief valve 303 and the first inlet hole 305, and the first hydraulic line 304 may be made of a metallic tubular material, and a second hydraulic line 307 made of a metallic tubular material may be connected between the second outlet hole 306 and the second inlet hole 309.

A check valve 308 may be installed at the second hydraulic line 307 so as to prevent the hydraulic pressure outputted from the second outlet hole 306 from flowing back toward the second outlet hole 306, by means of which the hydraulic pressure can flow only in the direction from the second outlet port 306 to the second inlet hole 309.

This check valve 308 may be installed at the second outlet hole 306 or the second inlet hole 309.

The operation of a first embodiment of the present invention will be described.

The rod 311 remains extended when cultivating soil normally. In this state, a predetermined pressure may be formed inside of the cylinder body 301, namely, at a front side of the pressurizing plate 312, whereby the plowing unit 200 can be supported, not rotating upward.

In this state, the relief valve 303 remains closed since a pressure higher than the pressure set inside of the cylinder body 301 has not been formed.

If the plowing unit 200 collides with a predetermined obstacle, for example, a stone or a rock, the force higher than the pressure inside of the cylinder body 301 may be applied to the plowing unit 200, so the plowing unit 200 may rotate upward from the main frame 100 and may be lifted up so as to avoid the obstacle. In this state, as the rod 311 is retracted, the pressure inside of the cylinder body 301 may increase.

If the pressure inside of the cylinder body 301 increases overly and becomes higher than the pressure set at the relief valve 303, the relief valve 303 may be open, so the hydraulic pressure inside of the cylinder body 301 may be inputted into the rear portion of the pressurizing plate 312 via the first outlet hole 302, the relief valve 303, the first hydraulic line 304 and the first inlet hole 305.

At the same time, the pressure formed at a rear side of the pressurizing plate 312 via the second outlet hole 306 may be inputted into a front portion of the pressurizing plate 312 via the second hydraulic line 307 and the second inlet hole 309. At this time, the pressure formed at a front portion of the pressurizing plate 312 will not flow back to the second outlet hole 306 with the aid of the check valve 308.

The front portion and the rear portion of the pressurizing plate 312 share pressure, so the same pressure can be formed. In the rear portion of the pressurizing plate 312, the pressurized area may decrease by as much as the thickness of the rod 311 as compared to the front portion thereof. For this reason, the front portion of the pressurizing plate 312 may receive a higher pressure than at the rear portion, so a force allowing to extend the rod 311 can generate.

Since the rod 311 can extend with the aid of the pressure which applies to the front portion of the pressurizing plate 312 after the plowing unit 200 has avoided the obstacle, the plowing unit 200 can return back to its initial position, and at the same time, the hydraulic pressure at the rear portion of the pressurizing plate 312 can be inputted into the second inlet hole 309 via the second outlet hole 306.

During the normal cultivation work wherein the plowing unit 200 does not collide with a predetermined obstacle, the pressure formed at the front portion of the pressurizing plate 312 may be higher than the pressure formed at the rear portion. For this reason, the plowing unit 200 cannot be easily lifted up, so the soil can be cultivated evenly.

The aforementioned configuration may allow to provide a simpler-looking configuration since the hydraulic pressure of the driving cylinder 300 is not transferred by using an additional cylinder.

Figure 3:
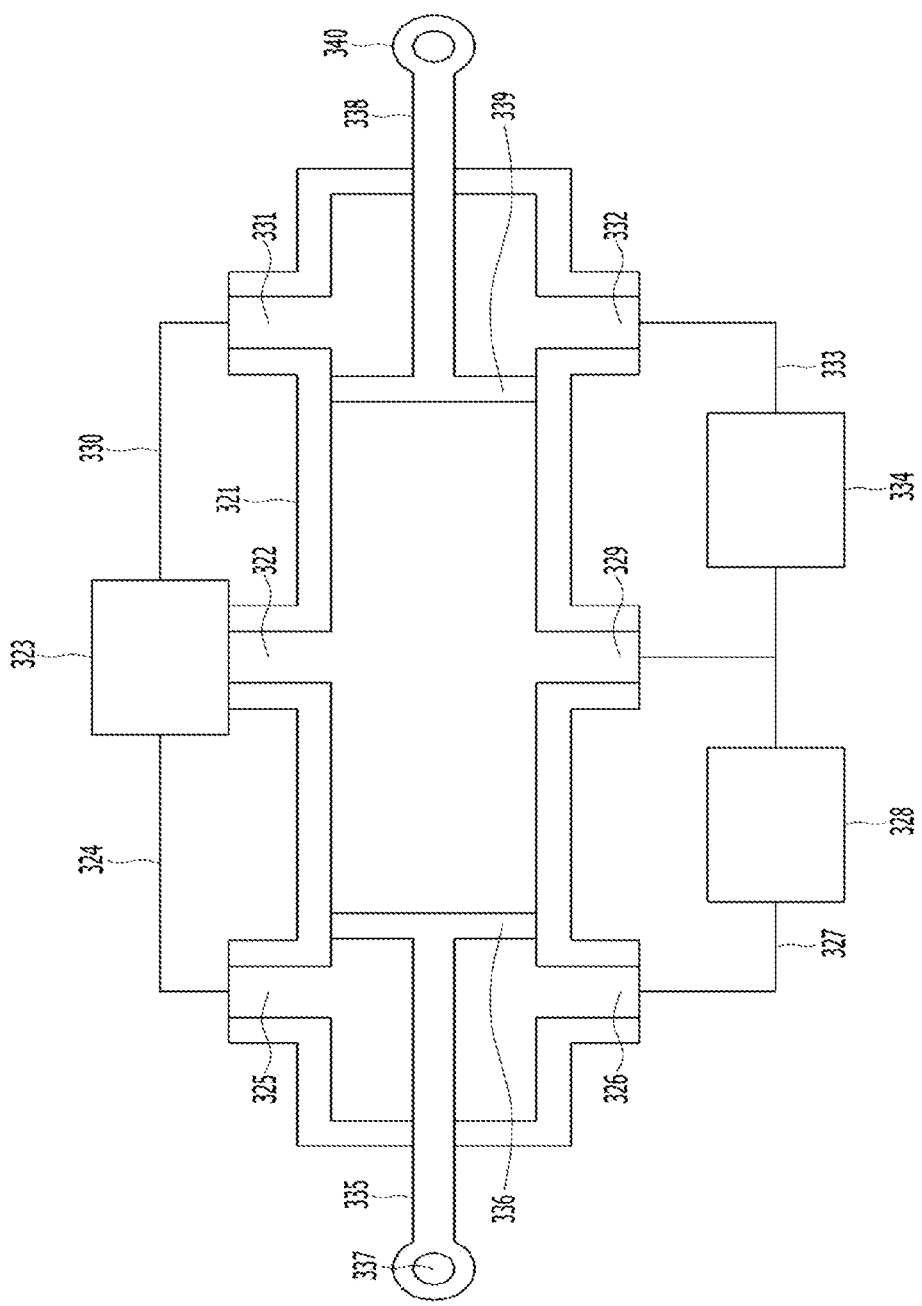
FIG. 3 is a view illustrating a safety apparatus for a cultivator according to a second embodiment of the present invention.

FIG. 3 is a view illustrating a configuration according to a second embodiment of the present invention, wherein the rods 337 and 340 of the cylinder are inserted into both sides of the body 321.

A first inlet hole 325 and a second outlet hole 326 may be formed at the rear portions of the pressurizing plate 336 of a first rod 337, and a second inlet hole 331 and a third outlet hole 332 may be formed at the rear portions of the pressurizing plate 339 of a second rod 338.

Moreover, a first check valve 328 may be installed at a third hydraulic line 307 or a second outlet hole 326. In this way, the hydraulic pressure outputted from the second outlet hole 326 can be prevented from flowing back to the second outlet hole 326. More specifically, the hydraulic pressure may flow only in the direction from the second outlet hole 326 to the third inlet hole 329.

A second check valve 334 may be installed at a fourth hydraulic line 333 or a third outlet hole 332, thus preventing the hydraulic pressure from flowing back to the third outlet hole 332. More specifically, the hydraulic pressure may flow only in the direction from the third outlet hole 332 to the third inlet hole 329.

The first check valve 328 may be installed at the second outlet hole 326 or the third hydraulic line 327, and the second check valve 334 may be installed at the third outlet hole 332 or the fourth hydraulic line 333.

The pin assembling unit 337 of the first rod 335 and the pin assembling unit 340 of the second rod may be engaged rotatable with the aid of the engaging unit 110 of the main frame 100 and the rotation engaging unit 210 of the plowing unit 200.

The operation of the second embodiment of the present invention is similar with the first embodiment of the present invention. If the cultivating unit 200 rotates upward due to a predetermined obstacle, the first rod 335 and the second rod 338 disposed at both sides of the body 321 are retracted, and the hydraulic pressure may be distributed into the first inlet hole 325 and the second inlet hole 331 via the relief valve 323, and the hydraulic pressure at the rear portions of the pressurizing plates 336 and 339 may be inputted into the third inlet hole 329 via the third hydraulic line 327 and the fourth hydraulic line 333.

If the avoidance from the obstacle is completed, the plowing unit 200 may descend with the aid of the self-weight of the plowing unit 200 and the pressure which applies to the front portions of the pressurizing plates 336 and 339, and since during the cultivation of soil, a pressure applies to the front portions of the pressurizing plates 336 and 339, wherein the pressure is higher than at the rear portions thereof. For this reason, the plowing unit 200 may not be easily lifted up, by means of which the soil can be cultivated evenly.

Figure 4:
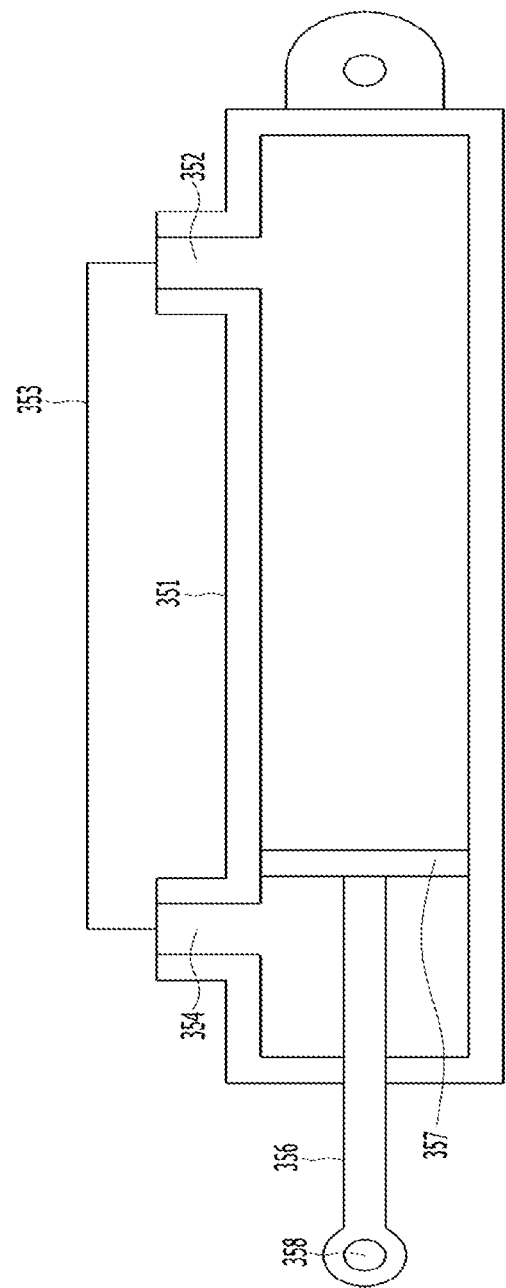
FIG. 4 is a view illustrating a safety apparatus for a cultivator according to a third embodiment of the present invention.

FIG. 4 is a view of a third embodiment of the present invention. A rod 356 may be engaged to one side of the cylinder body 351. A pressurizing plate 357 may be provided at a front end of the rod 356, and a pin assembling unit 358 may be disposed at a rear end thereof, wherein the pin assembling unit 358 will be engaged to the rotation engaging unit 210 of the plowing unit 200.

Moreover, a first hydraulic hole 354 may be formed at one side where the rod 356 of the cylinder body 351 is inserted, and the first hydraulic hole 354 may position at a rear portion of the pressurizing plate 357 when the rod 356 extends.

A second hydraulic hole 352 may be formed at the other side of the body 351. A hydraulic line 351 made of a metallic tubular material may be connected between the first hydraulic hole 354 and the second hydraulic hole 352.

If the cultivating unit 200 rotates upward due to a predetermined obstacle, the rod 356 may be retracted, and the hydraulic pressure at the front portion of the pressurizing plate 357 may flow into the first hydraulic hole 354 via the second hydraulic hole 352.

At this time, the hydraulic pressure at the front portion of the pressurizing plate 357 may be same as the hydraulic pressure at the rear portion thereof. As for the pressure at the rear portion of the pressurizing plate 357, the front portion of the pressurizing plate 357 may receive a higher pressure than at the rear portion thereof since the pressurized area decreases by as much as the thickness of the rod 356, the rod 356 may have a force high enough for the rod 356 to extend.

Since the rod 356 can extend by the pressure which applies to the front portion of the pressurizing plate 357 after the plowing unit 200 has avoided the obstacle, the plowing unit 200 will return to its initial position, and at the same time, the hydraulic pressure of the pressurizing plate 357 may be inputted into the second inlet hole 352 via the hydraulic line 353.

During the normal cultivation work wherein the plowing unit 200 does not collide with a predetermined obstacle, the pressure formed at the front portion of the pressurizing plate 357 may be higher than at the rear portion thereof, so the plowing unit 200 may not be easily lifted up. In this way, the soil can be cultivated evenly.

Figure 5:
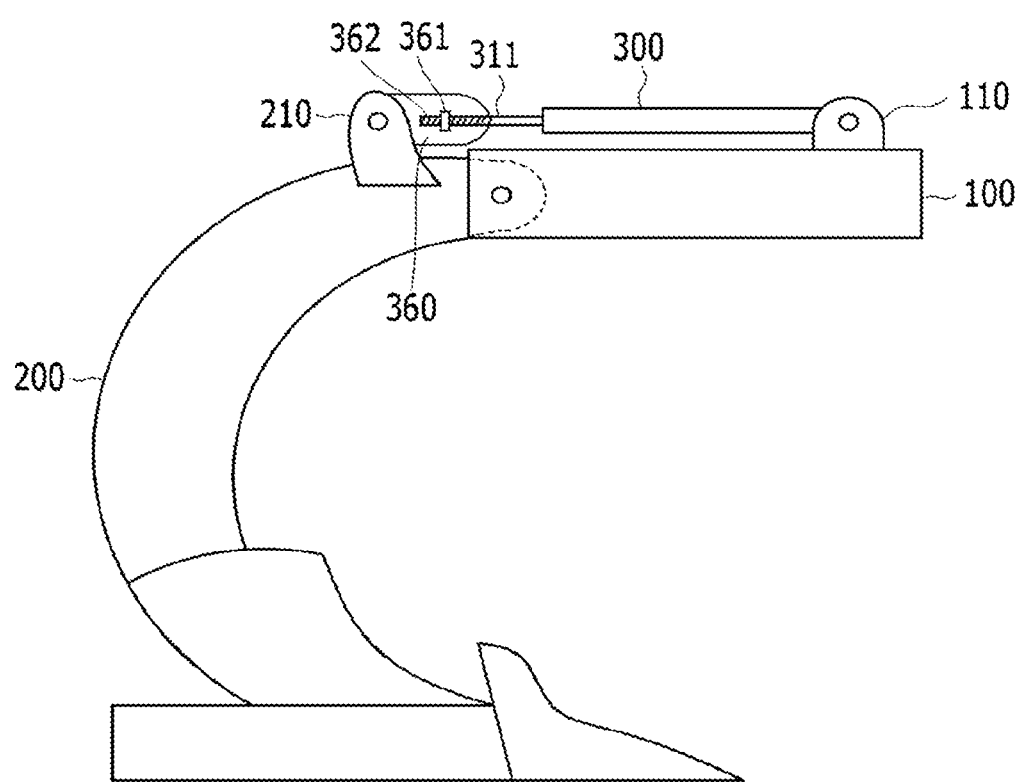
FIGS. 5 and 6 are views illustrating a configuration for adjusting a pressurizing force of a pressurizing plate according to the present invention.

Referring to FIG. 5, in the first and third embodiments of the present inventions, a rotation arm 360 is engaged rotatable upward and downward to the rotation engaging unit 210, and a nut member 361 is fixed at the rotation arm 360, and a thread portion 362 is formed at an outer portion of the rod 311 corresponding to a portion which is not inserted into the cylinder 300, and the thread portion 362 is engaged with the nut member 361.

The position of the pressurizing plate inside of the cylinder 300 may be determined based on the position of the rod 311 which is fixedly engaged to the nut member 361, for which the level of the hydraulic pressure in the hydraulic pressure space may greatly change.

More specifically, the pressurizing force of the pressurizing plate can be adjusted based on the stroke distance of the rod 311. In winter, the position of the pressurizing plate can be moved forward in such a way to more forwardly moving it into the inside of the cylinder by rotating the rod 311, thus setting an initial state thereof.

In this way, it is possible to maintain an appropriate hydraulic pressure even during the condensation of the hydraulic pressure due to a cold weather, in such a way to increase the hydraulic pressure in the hydraulic pressure space.

Since the hydraulic pressure expands in hot summer, the initial state may be set in such a way to move backward the position of the pressurizing plate by backwardly moving the rod 311, so an appropriate pressure can be maintained.

The level of the pressure formed inside of the cylinder 300, therefore, can be adjusted by fixing the initial state of the rod 311.

The rotation arm 360 and the nut member 361 may be disposed at the engaging unit 110. The cylinder 300 may be installed in the opposite direction, wherein the rear portion thereof may be engaged rotatable to the rotation engaging unit 210, and the rod 311 may be engaged to the nut member 361.

The aforementioned configuration is employed to the second embodiment of the present invention, more specifically, it can be applied to the first rod 335 and the second rod 338.

The rotation arm may be provided at each of the rotation engaging unit 210 and the engaging unit 110, and the first rod 335 and the second rod 338 may be engaged to the nut member provided at the rotation arm.

Figure 6:
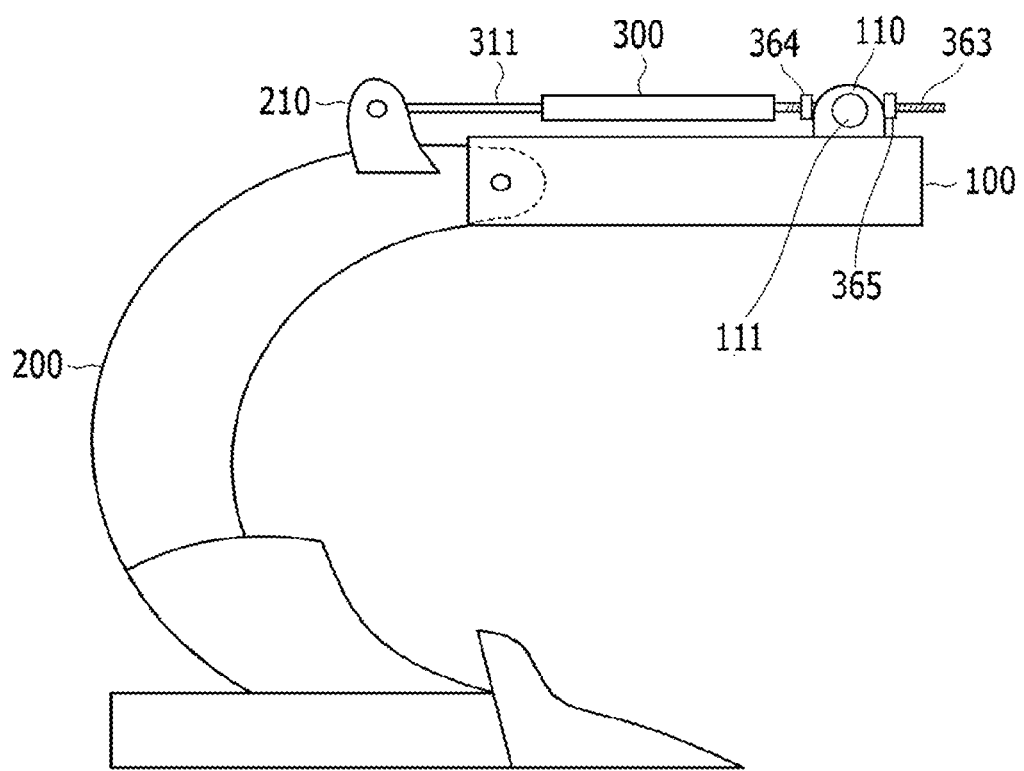

Referring to FIG. 6, a long bolt 363 may be connected to a rear portion of the cylinder 300. The long bolt 365 may be positioned in upward and downward directions after it has been passed through a rotary shaft 111 of the engaging unit 110. The long bolt 365 may be finally fixed at the rear and front portions of the rotary shaft 111 with the aid of the nut members 363 and 364.

In this way, it is possible to adjust the pressurizing force of the pressurizing plate since the stroke distance of the rod 311 is limited in such a way to change the front and rear positions of the cylinder 300.

The aforementioned configuration may be applied to the rotation engaging unit 210 after the position of the cylinder 300 has been inverted.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

| Legend of Reference Numbers | |
|---|---|
| 301: Cylinder body | 302: First outlet hole |
| 303: Relief valve | 304: First hydraulic line |
| 305: First inlet hole | 306: Second outlet hole |
| 307: Second hydraulic line | 308: Check valve |
| 309: Second inlet hole | 310: Pin assembling unit |
| 311: Rod | 312: Pressurizing plate |

What is claimed is:

1. A cultivating apparatus, comprising:
a main frame;
a cultivating unit which is installed rotatable upward and downward at the main frame, thus cultivating soil; and
a driving cylinder which is able to elastically support the cultivating unit with respect to the rotations from the main frame,
wherein the driving cylinder includes:
a body having an inner chamber;
a rod inserted in the body through a first end of the body, wherein the body includes a second end opposite to the first end, and the second end is connected to the main frame;
a pressuring plate provided at a front end of the rod, the pressuring plate having a first surface connected to the rod and a second surface opposite to the first surface;
a first hydraulic hole which is formed at one side of the body;
a second hydraulic hole which is formed at the other side of the body; and
a hydraulic line which is employed to connect the first hydraulic hole and the second hydraulic hole,
wherein the first hydraulic hole positions at a rear portion of the pressurizing plate when the rod extends from the body, and the second hydraulic hole position at a front portion of the pressurizing plate when the rod is retracted, and the pressurizing plate divides the inner chamber into a first chamber positioned at the rear portion of the pressurizing plate and a second chamber positioned at the front portion of the pressurizing plate,
wherein the second chamber, the second hydraulic hole, the hydraulic line, the first hydraulic hole and the first chamber are connected with each other and collectively form a closed loop without including an additional reservoir.

2. The apparatus of claim 1, wherein a thread portion is formed at the rod and a rotation arm is engaged rotatable to the cultivating unit, and a nut member is fixedly installed at the rotation arm, by which the rod and the nut member are engaged.

3. The apparatus of claim 1, wherein a long bolt is connected to a rear portion of the driving cylinder, and the long bolt is engaged rotatable in upward and downward directions to an engaging unit formed at the main frame.

4. The apparatus of claim 1, further comprising an engaging unit formed at the main frame, wherein the second end of the body is connected to the main frame via the engaging unit.

5. A cultivating apparatus, comprising:
a main frame;
a cultivating unit which is installed rotatable upward and downward at the main frame, thus cultivating soil; and
a driving cylinder which is able to elastically support the cultivating unit with respect to the rotations from the main frame,
wherein the driving cylinder includes:
a body;
a rod inserted in the body;
a pressuring plate provided at a front end of the rod;
a first hydraulic hole which is formed at one side of the body;
a second hydraulic hole which is formed at the other side of the body; and
a hydraulic line which is employed to connect the first hydraulic hole and the second hydraulic hole,
wherein the first hydraulic hole positions at a rear portion of the pressurizing plate when the rod extends from the body, and the second hydraulic hole position at a front portion of the pressurizing plate when the rod is retracted, and
wherein the body forms an inner chamber filled with hydraulic fluid, and the inner chamber is divided into a first chamber and a second chamber by the pressuring plate, and, when the cultivating unit rotates upward, the rod pushes the pressuring plate toward the second chamber and generates hydraulic fluid flow, and the hydraulic line connects the second chamber to the first chamber such that the hydraulic fluid flow moves from the second chamber via the second hydraulic hole into the first hydraulic hole, then directly into the first chamber, without flowing into an additional reservoir, increasing hydraulic pressure of the hydraulic fluid in the inner chamber in accordance with an increase of a volume occupied by the rod within the inner chamber.

6. The apparatus of claim 5, wherein a thread portion is formed at the rod and a rotation arm is engaged rotatable to the main frame or the cultivating unit, and a nut member is fixedly installed at the rotation arm, by which the rod and the nut member are engaged.

7. The apparatus of claim 5, wherein a long bolt is connected to a rear portion of the driving cylinder, and the long bolt is engaged rotatable in upward and downward directions to an engaging unit formed at the main frame or the cultivating unit.

8. A cultivating apparatus, comprising:
a main frame;
a cultivating unit which is installed rotatable upward and downward at the main frame, thus cultivating soil; and
a driving cylinder which is able to elastically support the cultivating unit with respect to the rotations from the main frame,
wherein the driving cylinder includes:
a body having an inner chamber;
a rod inserted in the body through a first end of the body, wherein the body includes a second end opposite to the first end, and the second end is connected to the main frame;
a pressuring plate provided at a front end of the rod, the pressuring plate having a first surface connected to the rod and a second surface opposite to the first surface;
a first hydraulic hole which is formed at one side of the body;
a second hydraulic hole which is formed at the other side of the body; and
a hydraulic line which is employed to connect the first hydraulic hole and the second hydraulic hole,
wherein the first hydraulic hole positions at a rear portion of the pressurizing plate when the rod extends from the body, and the second hydraulic hole position at a front portion of the pressurizing plate when the rod is retracted, and the pressurizing plate divides the inner chamber into a first chamber positioned at the rear portion of the pressurizing plate and a second chamber positioned at the front portion of the pressurizing plate, wherein, the hydraulic line connects the first chamber and the second chamber, such that:

in response to overload, the rod is retracted from an initial position toward the second chamber, hydraulic pressure of fluid within the inner chamber increases from an initial pressure due to an increase of a volume occupied by the rod within the inner chamber, and the second surface of the pressuring plate receives a second pressure that is higher than a first pressure which the first surface of the pressuring plate receives, in accordance with a pressurized area of the first surface on which a pressure is exerted, being smaller than a pressurized area of the second surface on which a pressure is exerted, by as much as a thickness of the rod connected to the first surface; and in response to release of the overload, the second pressure on the second surface, which is higher than the first pressure on the first surface, pushes the pressuring plate toward the first chamber and returns the rod to the initial position, and returns the hydraulic pressure of the fluid within the inner chamber to the initial pressure.

\* \* \* \* \*